United States Patent [19]

Coombs et al.

[11] 3,843,666
[45] Oct. 22, 1974

[54] PROCESS FOR PREPARING SUBSTITUTED INDENO, NAPHTHO AND CYCLOHEPTA PYRAZOLES

[75] Inventors: Robert V. Coombs, Chatham; William J. Houlihan, Mountain Lakes, both of N.J.

[73] Assignee: Sandoz-Wander, Inc., Hanover, N.J.

[22] Filed: May 29, 1973

[21] Appl. No.: 364,697

[52] U.S. Cl.... 260/296 T, 260/240 F, 260/294.8 R, 260/295 S, 260/296 B, 260/296 P, 260/310 R, 260/348 R, 424/263, 424/266, 424/273

[51] Int. Cl............................................ C07d 31/42

[58] Field of Search....... 260/294.8 B, 296 T, 310 R

[56] References Cited
UNITED STATES PATENTS 3,624,102  11/1971  Brown et al..................... 260/310 R
3,790,576   2/1974  DeWald .......................... 260/310 R

*Primary Examiner*—Alan L. Rotman
*Attorney, Agent, or Firm*—Gerald D. Sharkin; Robert S. Honor; Thomas O. McGovern

[57] ABSTRACT

Substituted indeno[1,2-c]pyrazoles, naphtho[1,2-c]pyrazoles and benzo[6,7]cyclohepta[1,2-c]pyrazoles, e.g., 3-(2,3-dimethoxyphenyl)-4H-indeno[1,2-c]pyrazole and 4,5-dihydro-3-(4-pyridyl)-2H-naphtho[1,2-c]pyrazole, are prepared from hydrazone derivatives of spiro indanes, spiro α-tetralones and spiro benzosuberane.

17 Claims, No Drawings

PROCESS FOR PREPARING SUBSTITUTED INDENO, NAPHTHO AND CYCLOHEPTA PYRAZOLES

This invention relates to a process for preparing indeno[1,2-c]pyrazoles, naphtho[1,2-c]pyrazoles, and benzo[6,7]cyclohepta[1,2-c]pyrazoles. More particularly it relates to the preparation of 3-aryl and 3-heterocyclic derivatives of indeno[1,2c]pyrazole, naphtho[1,2-c]pyrazole and benzo[6,7]cyclohepta[1,2-c]pyrazole.

The compounds of this invention may be represented by the following formula:

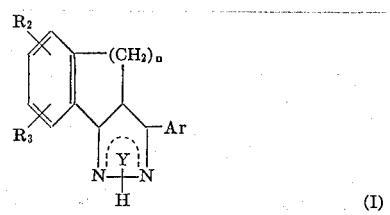

(I)

where
n is 1, 2 or 3
Ar is

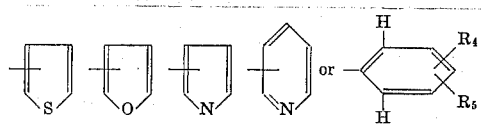

and $R_2$, $R_3$, $R_4$ and $R_5$ each independently represent hydrogen, halo having an atomic weight of about 19 to 36, lower alkyl, ie., alkyl having 1 to 4 carbon atoms, e.g., methyl, ethyl, isopropyl and the like; lower alkoxy, i.e., alkoxy having 1 to 4 carbon atoms, e.g., methoxy, ethoxy, isopropoxy, and the like, or trifluoromethyl, or $R_2$ and $R_3$ or $R_4$ and $R_5$ together independently represent methylenedioxy attached to adjacent carbon atoms provided that when $R_2$ and $R_3$ or $R_4$ and $R_5$ are independently trifluoromethyl or tertiary butyl, they are not on adjacent carbon atoms; and when n is 1 and $R_2$ and $R_3$ are hydrogen, Ar is other than unsubstituted phenyl and pharmaceutically acceptable acid addition salts thereof.

The pyrazole ring (Y) in the compounds of formula (I) can have the following structures:

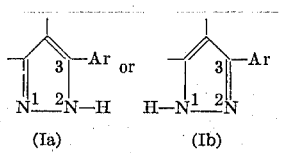

where Ar is as defined above: It should be noted that the compounds of structures (Ia) and (Ib) are considered equivalent and are known to exist in both tautomeric forms.

The compounds of formula (I) are prepared in accordance with the following reaction scheme:

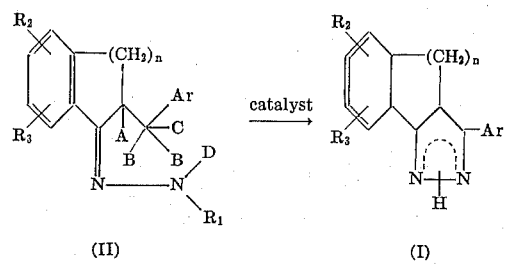

where
i. the catalyst is an organic carboxylic or sulfonic acid when
  a. A and B together are

and $R_1$, C and D are each hydrogen or
  b. A is hydroxyl B and D together are a carbon to carbon bond and $R_1$ and C are hydrogen or
ii. the catalyst is an alkali metal or alkali metal hydroxide when A and B together and C and D together are carbon to carbon bonds and
  $R_1$ is —$COR_6$ or —$SO_2R_6$
  $R_6$ is —$CH_3$ or

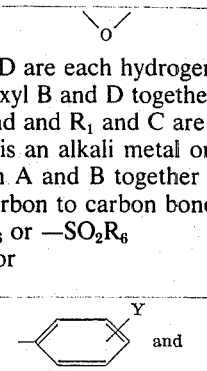

and

Y is hydrogen, chlorine or —$CH_3$.

The compounds of formula (I) are prepared by
a. cyclizing a compound of formula (II) having the formula

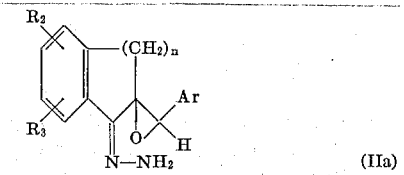

(IIa)

where n, $R_2$, $R_3$, Ar and the proviso are as set out above, with an organic carboxylic acid such as acetic acid, propionic acid and the like or an organic sulfonic acid such as p-toluenesulfonic acid, methanesulfonic acid and the like. The particular organic carboxylic or sulfonic acid used is not critical. Although a solvent is not necessary, it is preferred that the reaction be run in an inert solvent, such as aromatic hydrocarbons, e.g., benzene, toluene, chlorobenzene, dichlorobenzene and the like. The particular solvent used in the reaction is not critical. The temperature also is not critical but it is preferred that the reaction be carried out between about 75° to about 175°C, especially at the reflux temperature of the solvent. It is also preferred that the reaction be run for about 6 to 24 hours. The product is recovered by standard techniques, e.g., evaporation;

b. Dehydrating a compound of formula (II) having the formula

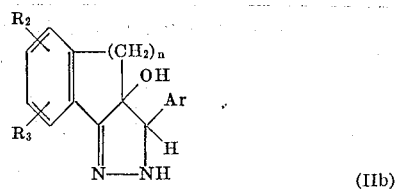

(IIb)

using the same conditions under which the compounds of formula (IIa) are prepared, or c. by hydrolysis of a compound of formula (II) having the formula

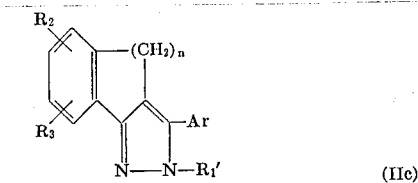

(IIc)

where $R^1$ is $-COR_6$ or $-SOR_6$ and $n$, $R_2$, $R_3$, $R_6$, Ar and the proviso are as set out above, with a base such as an alkali metal e.g., potassium, sodium and the like or an alkali metal hydroxide e.g., potassium hydroxide, sodium hydroxide and the like. The particular alkali metal or alkali metal hydroxide used is not critical. Although a solvent is not necessary, it is preferred that the reaction be run in an inert solvent, such as water or the lower alkanols having 1 to 4 carbon atoms, e.g., methanol, ethanol, and the like. The particular solvent used in the reaction is not critical. The temperature also is not critical but it is preferred that the reaction be carried out between about 50° to about 150°C, especially at the reflux temperature of the solvent. It is also preferred that the reaction be run for about 8 to 30 hours. The product is recovered by standard techniques, e.g., precipitation and filtration.

The compounds of (IIa) may be prepared in accordance with the following reaction scheme:

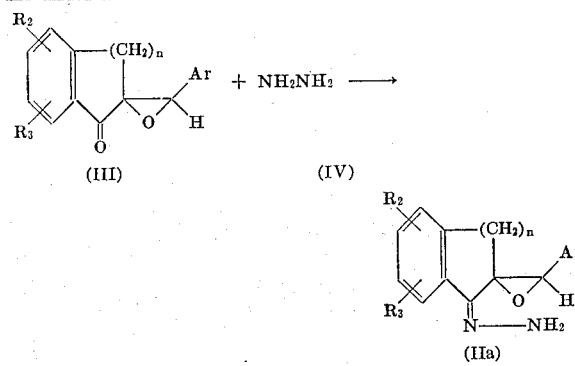

where $n$, $R_2$, $R_3$, Ar and the proviso are as set out above.

The compounds of formula (IIa) are parepared by treating a compound of formula (III) with a compound of formula (IV) at a temperature between about −10° to +10°C, preferably 0° to 5°C. Although a solvent is not required, it is preferred that the reaction be carried out in the presence of an inert solvent such as aliphatic or aromatic hydrocarbons e.g., hexane, benzene, toluene, straight chain or cyclic ethers, e.g., tetrahydrofuran, dioxane, diethyl ether and the like. The particular solvent used is not critical. It is preferred that the reaction be run from 8 to 30 hours and the product is recovered in the usual manner, e.g., by evaporation and crystallization.

The compounds of formula (IIc) may be prepared according to the following procedure:

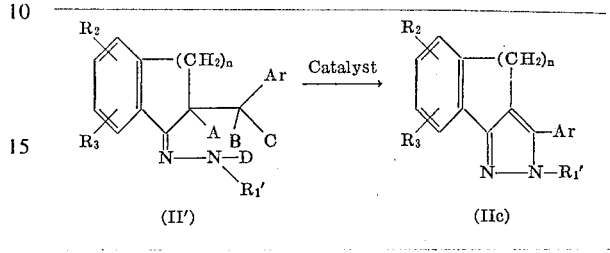

where i. A and B together are

and

C and D are hydrogen or ii. A is hydroxyl,

B and D together are a carbon to carbon bond and C is hydrogen;

$n$, $R_1'$, $R_2$, $R_3$, Ar and the proviso are as defined above and the catalyst is an organic carboxylic or sulfonic acid.

The compounds of formula (IIc) are prepared by treating a compound of formula (II′) with an organic carboxylic or sulfonic acid such as acetic acid, p-toluenesulfonic acid, methane-sulfonic acid and the like. The preferred acid is acetic acid. Although a solvent is not required, it is preferred that the reaction be carried out in the presence of an inert solvent such as straight chain ethers or cyclic ethers, e.g., n-butyl ether, tetrahydrofurane, dioxane and the like. The particular solvent used is not critical, but dioxane is especially preferred. The temperature of the reaction also is not critical, but it is generally carried out between 50° to 150°C, preferably at the reflux temperature of the system. It is further preferred that the reaction be run for from 8 to 30 hours. The product is recovered in the usual manner, e.g., by evaporation and crystallization.

The compounds of formula (II′) in which A is hydroxyl, B and D together are a carbon to carbon double bond and C is hydrogen may be prepared in accordance with the following reaction scheme from the compounds of formula (II′) in which A and B together are

and C and D are hydrogen:

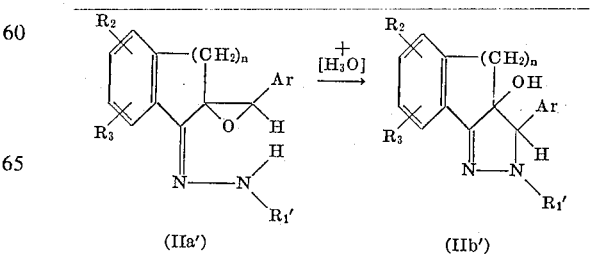

where $n$, $R_1'$, $R_2$, $R_3$, Ar and the proviso are as set out above.

The compounds of formula (IIb') are prepared by treating a compound of formula (IIa') with a mineral acid such as hydrochloric acid, sulfuric acid, phosphoric acid and the like. The preferred acid is hydrochloric acid. Although a solvent is not required, it is preferred that the reaction be carried out in the presence of an inert solvent such as the lower alkanols having 1 to 4 carbon atoms, e.g., methanol, ethanol, butanol and the like. The temperature of the reaction also is not critical, but it is generally carried out between 0° and 30°C, preferably between about 15° to 20°C. It is further preferred that the reaction be run for from 12 to 48 hours. The product is recovered in the usual manner, e.g., by precipitation and crystallization.

The compounds of formula (IIb) may be prepared in accordance with the following reaction scheme:

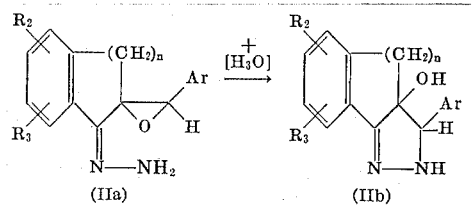

where $n$, $R_2$, $R_3$, Ar and the proviso are as set out above.

The compounds of formula (IIb) are prepared by treating the compounds of formula (IIa) with a mineral acid such as hydrochloric acid, sulfuric acid or phosphoric acid under the same conditions as a compound of formula (IIb') is prepared from a compound of formula (IIa').

The compounds of formula (IIa') may be prepared in accordance with the following reaction scheme:

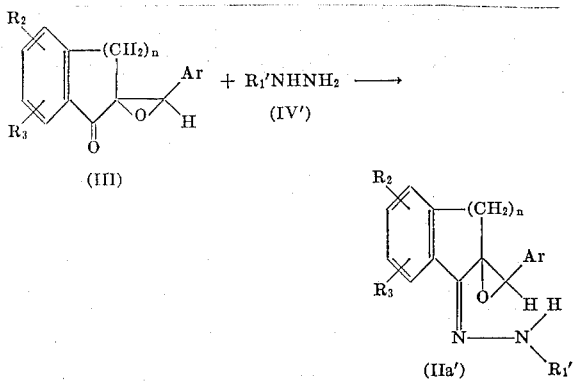

where $n$, $R_1$, $R_2$, $R_3$, Ar and the proviso are as set out above.

The compounds of formula (II'a) are prepared by treating a compound of formula (III) with a compound of formula (IV'). Although a solvent is not required, it is preferred that the reaction be carried out in the presence of an inert solvent such as the lower alkanols having 1 to 4 carbon atoms e.g., methanol, ethanol and the like, straight chain ethers or cyclic ethers, e.g., diethyl ether, dioxane, tetrahydrofuran and the like. The particular solvent used is not critical, but the lower alkanols, such as methanol, ethanol, butanol and the like or dioxane are preferred, especially ethanol and dioxane. The temperature of the reaction is not critical, but it is generally carried out between about 0° to 35°C, preferably 15° to 20°C. For optimum results it is preferred that the reaction be run for from 12 to 48 hours, preferably 24 hours. The product is recovered in the usual manner, e.g., by precipitation and crystallization.

The compounds of formula (IIc) in which $R_1$ is

may be prepared in accordance with the following reaction scheme:

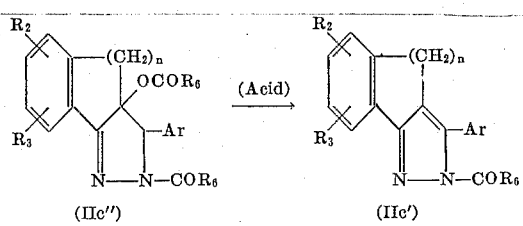

where $n$, Ar, $R_2$, $R_3$, $R_6$ and the proviso are as set out above.

The compounds of formula (IIc') are prepared by hydrolyzing a compound of formula (IIc'') under acid conditions. The acidic conditions can be provided by a mineral acid such as hydrochloric acid, sulfuric acid, and the like or by an organic acid such as acetic acid or p-toluenesulfonic acid. The preferred acids are hydrochloric acid or acetic acid. Although a solvent is not required, it is preferred that the reaction be carried out in the presence of an inert solvent such as water, the lower alkanols, aliphatic or aromatic hydrocarbons, halogenated hydrocarbons, straight chain ethers or cyclic ethers or mixtures of the foregoing. The particular solvent used is not critical, but water, the lower alkanols such as methanol, ethanol, butanol and the like or dioxane are preferred, especially ethanol and dioxane. The temperature of the reaction also is not critical, but it is generally carried out between 35° to 200°C, preferably at the reflux temperature of the system. For optimum results it is preferred that the reaction be run for from about 4 to 8 hours. The product is recovered in the usual manner, e.g., by extraction and crystallization.

The compound of formula (IIc'') may be prepared in accordance with the following reaction scheme:

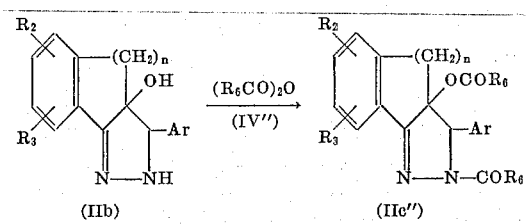

where $n$, Ar, $R_2$, $R_3$, $R_6$ and the proviso are as set out above.

The compounds of formula (IIc'') are prepared by treating a compound of formula (IIb) with acetic anhydride. The reaction is preferably carried out in the presence of a sodium or potassium salt of an organic acid corresponding to the compound of formula (IV''). Although a solvent is not required, it is preferred that the reaction be carried out in the presence of an inert solvent such as aliphatic or aromatic hydrocarbons, halogenated hydrocarbons, straight chain ethers or cyclic ethers. The particular solvent used is not critical, but aromatic hydrocarbons are preferred, especially benzene or toluene. The temperature of the reaction also is not critical, but it is generally carried out between 35° and 200°C, preferably at the reflux temperature of the system. For optimum results it is preferred that the reaction be run for from 5 to 8 hours. The product is recovered in the usual manner, e.g., by evaporation and crystallization.

The compounds of formula (III) are prepared in accordance with the following reaction scheme:

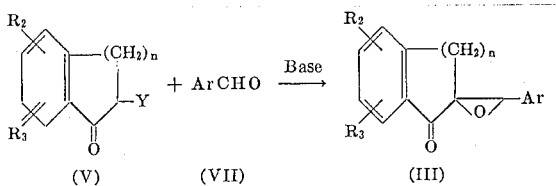

where
Y is a leaving group and
$n$, $R_2$, $R_3$, Ar and the proviso are as set out above.

The compounds of formula (III) are prepared by treating the compounds of formula (V) with the compounds of formula (VII) under basic conditions in an inert solvent. It is preferred that the reaction be run in an inert atmosphere such as argon, helium and especially nitrogen. The leaving group Y in formula (V) can be any of the conventional leaving groups employed in such a reaction, such as chlorine, bromine, iodine, tosylate, mesylate and the like. The preferred leaving group is the halogens, especially chlorine or bromine. The basic conditions for the reaction are provided by alkali or alkali earth metal hydroxides, alkali metal lower alkoxides, tertiary aliphatic and aromatic amines and tertiary cyclic amines such as pyridine and the like. Although the particular solvent used is not critical, the lower alkanols such as methanol, ethanol, butanol and the like are especially preferred, in particular the lower alkanol corresponding to the alkali metal alkoxide when used. The temperature of the reaction is not critical, but it is generally carried out between 0° and 30°C, preferably about 5° to 10°C. Although the time is not critical, it is preferred that the reaction be run for from 1 to 5 hours. The product is recovered by standard techniques, e.g., by precipitation and crystallization.

The compounds of formulas (V) are prepared by well known procedures from compounds of the formula:

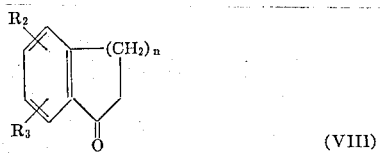

where $n$, $R_2$, $R_3$ and the proviso are as set out above.

The compounds of formula (V) may be obtained by standard procedure from compounds of formula (VIII). For example, the chlorine or bromine substituted compounds can be prepared by treating the compound of formula (VIII) with chlorine or bromine, preferably in an inert solvent such as acetic acid, chloroform or carbon tetrachlorine. The reaction can be carried out at temperatures from room temperature to 50° over a period of 1 to 12 hours preferably 3 to 6 hours. The particular solvent, temperature or time used in the reaction are not critical.

The tosylate and mestylate can be prepared from the chlorine or bromine substituted compound by treatment with a tosylate or mesylate salt, such as sodium or potassium tosylate or mestylate in an inert solvent such as the above lower alcohols, toluene or benzene. The reaction is preferably carried out at temperatures between 15° to 70° especially between 25° to 40° for a period of 2 to 10 hours, preferably 4 to 7 hours. The particular solvent used, the temperature and the time of the reaction are not critical.

The compounds of formulas (IV) and (IV'') and many of the compounds of formula (IV'), (VII), and (VIII) are known and are prepared by procedures disclosed in the literature. The compounds of formula (IV'), (VII) and (VIII) not specifically disclosed in the literature may be prepared by analogous methods using known starting materials.

The compounds of formula (I) are useful because they possess pharmacological activity in animals. In particular, the compounds are useful as hypotensive/anti-hypertensive agents, as indicated by their activity in renal hypertensive rats given 10 to 100 mg/kg of active compound using the techniques of A. Grollman (Proc,Soc. Exptl, Biol, and Med. 57:102, 1944) and indirectly measuring the blood pressure from the caudal artery in the tail using a pneumatic pulse transducer.

The compounds of formula (I), in particular the compounds of formula (I) in which $n$, is 2, $R_1$ is hydrogen, and Ar is pyridyl or substituted phenyl, e.g., 4,5-dihydro-3-(4-pyridyl)-2H-naphtho[1,2-c]pyrazole, are also useful as anti-fertility agents as indicated by their activity in female Wistar rats which are injected daily with 2 mg of the compound for eight successive days starting on the day of vaginal cornification. At the time of the fourth injection, males of known fertility are cohabitated with the females (one female with one male) until the end of the treatment period. The males are separated from the females 24 hours following the last injection. The females are sacrificed six days later, and examined for the presence of absence of implantation sites.

The use of the compounds as anti-fertility agents is further indicated by their luteolytic properties which results in the compounds being abortifacient agents. The luteolytic activity is determined using pseudopregnant rabbits treated with corn oil or 1 to 100 mg. per day of a compound of formula (I) suspended in corn oil on days 3 through 8 of pseudopregnancy. Blood samples are obtained daily throughout the length of pseudopregnancy. Plasma samples are analyzed for progestin content according to the method of Johansson, et al (Endocrinology 82, 143, 1968). The compound is judged active if plasma progestin levels are similar to pretreatment values on day 12 of pseudopregnancy.

Abortifacient activity is also determined in female proestrous rats (Royal Hart, Wistar strain) selected from a colony and caged with fertile males. On the following day pregnancy is confirmed by the presence of spermatozoa in the viginal smear. On the seventh day following mating the females are treated with 1 to 30 milligrams of the compound to be tested. The animals are injected daily for a total of seven days; and on the eighth day following the first injection the animals are killed and the uterus checked for the presence or absence of implantation sites.

The compounds of formula (I), when used as antifertility agents exhibit none of the estrogenic effects and side effects exhibited by the steroidal type compounds used for these purposes.

When the compounds are employed for the above utilities, they may be combined with one or more pharmaceutically acceptable carriers or adjuvants, and may be administered orally in such forms as tablets, capsules, elixirs, suspensions and the like, e.g., bucally or sub-liqually as a tablet, parenterally in the form of an injectable solution or suspension or in special form such as suppositories, e.g., vaginal inserts, pessaries, and the like. Depending upon the compound employed and the mode of administration the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of the acid addition salts are the mineral acid salts, such as the hydrochloride, hydrobromide, sulfate, phosphate and the like and the organic acid salts, such as the malate, succinate, benzoate, acetate, methanesulfonate, gluconate, p-toluenesulfonate, benzenesulfonate, naphthalenesulfonate, and the like.

In general, satisfactory results are obtained when these compounds are administered as a hypotensive/anti-hypertensive agent at a daily dosage of about 2 milligrams to about 200 milligrams per kilogram of animal body weight. This daily dosage is preferably administered 2 to 4 times a day, or in sustained release form. For most large mammals, such as primates, the total daily dosage is from about 150 milligrams to about 2,000 milligrams. Dosage forms suitable for internal use comprise from about 37.5 milligrams to about 1,000 milligrams of the active compound in intimate admixture with a solid or liquid pharmaceutically acceptable carrier or diluent.

When the compounds of formula (I) are administered as an anti-fertility agent, satisfactory results are obtained at a daily dosage of about 1.0 milligrams to about 200 milligrams orally, subcutaneously or intramuscularly per kilogram of animal body weight. This daily dosage is preferably administered 1 to 4 times a day or in sustained release form. For most large mannals, such as primates, the total daily dosage is from about 1 milligram to about 600 milligrams. Dosage forms suitable for internal use comprise from about 0.25 milligrams to about 300 milligrams of the active compound in intimate admixture with a solid or liquid pharmaceutically acceptable carrier or diluent.

A representative formulation suitable for intramuscular administration once a day in fertility control is an injectable suspension prepared by standard techniques which contain the following:

| Ingredients | Weight (mg) |
| --- | --- |
| 4,5-dihydro-3-(4-pyridyl)-2H-naphtho[1,2-c]pyrazole | 200 |
| sodium carboxy methyl cellulose U.S.P. | 1.25 |
| methyl cellulose | 0.4 |
| polyvinylpyrrolidone | 5 |
| lecithin | 3 |
| benzyl alcohol | 0.01 |
| buffer agent to adjust pH for desired stability | q.s. |
| water | for injection q.s. to 2 ml |

EXAMPLE 1

4,5-dihydro-3-(4-pyridyl)-2H-naphtho[1,2-c]pyrazole

Step A: 3'-(4-pyridyl)-spiro[1,2,3,4-tetrahydronaphthoalene-2,2'-oxirane]-1one.

To a stirred solution of 11.3 g of 2-bromo-α-tetralone and 5.5 g. of pyridine-4-carboxaldehyde in 20 ml of methanol under nitrogen is added at 5° to 10°C a solution of sodium methoxide in methanol (prepared by dissolving 1.15 g of sodium in 50 ml methanol). After 2 hours, 3'-(4-pyridyl)-spiro[1,2,3,4-tetrahydronaphthalene-2,2'-oxirane]-1-one precipitates and is filtered off and recrystallized from methanol (m.p. 180°–182°C).

when an equivalent amount of
a. 2-bromo-6-chloro-α-tetralone;
b. 2-bromo-5-methyl-α-tetralone;
c. 2-bromo-6,7-dimethoxy-α-tetralone;
d. 2-bromo-6-trifluoromethyl-α-tetralone;
e. 2-bromo-6,7-methylenedioxy-α-tetralone or
f. 2-bromo-6-methoxy-α-tetralone is used in place of the 2-bromo-α-tetralone above there is obtained a. 3'-(4-pyridyl)-spiro[6-chloro-1,2,3,4-tetrahydronaphthalene-2,2'-oxirane]-1-one; (m.p. 155°C);
b. 3'-(4-pyridyl)-spiro[6-methyl-1,2,3,4-tetrahydronaphthalene-2,2'-oxirane]-1-one; (m.p. 147°C);
c. 3'-(4-pyridyl)-spiro[6,7-dimethoxy-1,2,3,4-tetrahydronaphthalene-2,2'-oxirane]-1-one; (m.p. 197°–200°C);
d. 3'-(4-pyridyl)-spiro[6-trifluoromethyl-1,2,3,4-tetrahydronaphthalene-2,2'-oxirane]-1-one;
e. 3'-(4-pyridyl)-spiro[6,7-methylenedioxy-1,2,3,4-tetrahydronaphthalene-2,2'-oxirane]-1-one (m.p. 166°–168°C) or
f. 3'-(4-pyridyl)-spiro[6-methoxy-1,2,3,4-tetrahydronaphthalene-2,2'-oxirane]-1-one respectively.

When an equivalent amount of
g. 2-thiophenealdehyde;
h. 2-furfural;
i. 2-pyrrolealdehyde;
j. pyridine-2-carboxaldehyde;
k. pyridine-3-carboxaldehyde;
l. p-chlorobenzaldehyde;
m. p-methoxybenzaldehyde;
n. benzaldehyde
o. p-tolualdehyde
p. m-tolualdehyde or
q. o-tolualdehyde is used in place of the pyridine-4-carboxaldehyde above, there is obtained
g. 3'-(2-thienyl)-spiro[1,2,3,4-tetrahydronaphthalene-2,2'-oxirane]-11-one;

h. 3'-(2-furyl)-spiro[1,2,3,4-tetrahydronaphthalene-2,2'-oxirane]-1-one;
i. 3'-(2-pyrrolyl)-spiro[1,2,3,4-tetrahydronaphthalene-2,2'-oxirane]-1-one;
j. 3'-(2-pyridyl)-spiro[1,2,3,4-tetrahydronaphthalene-2,2'-oxirane]-1-one;
k. 3'-(3-pyridyl)-spiro[1,2,3,4-tetrahydronaphthalene-2,2'-oxirane]-1-one;
l. 3'-(p-chlorophenyl)-spiro[1,2,3,4-tetrahydronaphthalene-2,2'-oxirane]-1-one;
m. 3'-(p-methoxyphenyl)-spiro[1,2,3,4-tetrahydronaphthalene-2,2'-oxirane]-1-one;
n. 3'-phenyl-spiro[1,2,3,4-tetrahydronaphthalene-2,2'-oxirane]-1-one;
o. 3'-(p-tolyl)-spiro[1,2,3,4-tetrahydronaphthalene-2,2'-oxirane]-1-one;
p. 3'-(m-tolyl)-spiro[1,2,3,4-tetrahydronaphthalene-2,2'-oxirane]-1-one or
q. 3'-(o-tolyl)-spiro[1,2,3,4-tetrahydronaphthalene-2,2'-oxirane]-1-one
respectively.

Step B: 3'-(4-pyridyl)-spiro[1,2,3,4-tetrahydronaphthalene-2,2'-oxirane]-1-one hydrazone A solution of 5 grams of 3'-(4-pyridyl)-spiro[1,2,3,4-tetrahydronaphthalene-2,2'-oxirane]-1-one in 20 ml. of toluene is cooled in an icebath to an internal temperature of 0° to 5°C, and treated dropwise with 25 ml of 97% NH$_2$NH$_2$. After stirring an additional two hours the resultant hydrazone of 3'-(4-pyridyl)-spiro[1,2,3,4-tetrahydronaphthalene-2,2'-oxirane]-1-one is isolated as an oil.

Following the above procedure and using in place of the 3'-(4-pyridyl)-spiro[1,2,3,4-tetrahydronaphthalene-2,2'-oxirane]-1-one an equivalent amount of each of the compounds (a) through (q) from step A above there is obtained the corresponding hydrazone of each of the compounds (a) through (q)

Step C: 4,5-dihydro-3-(4-pyridyl)-2H-naphtho[1,2-c]pyrazole

A solution of 3 grams of 3'-(4-pyridyl)-spiro[1,2,3,4-tetrahydronaphthylene-2,2'-oxirane]-1-one hydrazone, 50 ml of toluene and 100 milligrams of p-toluene sulfonic acid are stirred and refluxed for 8 hours. The toluene layer is washed with 10 ml. of 10% sodium bicarbonate solution, dried with magnesium sulfate, filtered and concentrated in vacuo to yield 4,5-dihydro-3-(4-pyridyl)-2H-naphtho[1,2-c]pyrazole, (m.p. 229°C).

When the above procedure is carried out using an equivalent amount of the hydrazone of each of the compounds (a) through (q) from Step B above in place of the 3'-(4-pyridyl)-spiro[1,2,3,4-tetrahydronaphthalene-2,2'-oxirane]11-one hydrazone, there is obtained;

a. 7-chloro-4,5-dihydro-3-(4-pyridyl)-2H-naphtho[1,2-c]pyrazole(m.p. 250°–252°C);
b. 7-methyl-4,5-dihydro-3-(4-pyridyl)-2H-naphtho[1,2-c]pyrazole(m.p. 222°–224°C);
c. 7,8-dimethoxy-4,5-dihydro-3-(4-pyridyl)-2H-naphtho[1,2-c]pyrazole(mp. 245°C);
d. 7-trifluoromethyl-4,5-dihydro-3-(4-pyridyl)-2H-naphtho[1,2-c]pyrazole;
e. 7,8-methylenedioxy-4,5-dihydro-3-(4-pyridyl)-2H-naphtho[1,2-c]pyrazole (m.p. 198°–200°C);
f. 7-methoxy-4,5-dihydro-3-(4-pyridyl)-2H-naphtho[1,2-c]pyrazole(m.p. 168°–170°C)
g. 4,5-dihydro-3-(2-thienyl)-2H-naphtho[1,2-c]pyrazole(m.p. 211°–213°C);
h. 4,5-dihydro-3-(2-furyl)-2H-naphtho[1,2-c]pyrazole(m.p. 160°–161°C);
i. 4,5-dihydro-3-(2-pyrrolyl)-2H-naphtho[1,2-c]pyrazole(m.p. 229°–230°C);
j. 4,5-dihydro-3-(2-pyridyl)-2H-naphtho[1,2-c]pyrazole(m.p. 182°–184°C);
k. 4,5-dihydro-3-(3-pyridyl)-2H-naphtho[1,2-c]pyrazole(m.p. 226°–228°C);
l. 4,5-dihydro-3-(p-chlorophenyl)-2H-naphtho[1,2-c]pyrazole(mp 194°–195°C);
m. 4,5-dihydro-3-(p-methoxyphenyl)-2H-naphtho[1,2-c]pyrazole (m.p. 161°–163°C);
n. 4,5-dihydro-3-phenyl-2H-naphtho[1,2-c]pyrazole(m.p. 173°–174°C);
o. 4,5-dihydro-3-(p-tolyl)-2H-naphtho[1,2-c]pyrazole(m.p. 184°–186°C);
p. 4,5-dihydro-3-(m-tolyl)-2H-naphtho[1,2-c]pyrazole(m.p. 161–163°C) or
q. 4,5-dihydro-3-(o-tolyl)-2H-naphtho[1,2-c]pyrazole (m.p. 186°14 187°C)
respectively.

When an equivalent amount of 2-bromo-benzo[b]cycloheptanone or 2-bromo-8-methoxy-benzo[b]cycloheptanone is substituted for the 2-bromo-α-tetralone in step A of this example, there is obtained following the processes of steps A, B and C above, 3-(4-pyridyl)-2,4,5,6-tetrahydrobenzo[6,7]cyclohepta[1,2-c]pyrazole(m.p. 217°–219°C) or 9-methoxy-3-(4-pyridyl)-2,4,5,6-tetrahydrobenzo[6,7]cyclohepta[1,2-c]pyrazole (m.p. 200°–201°C) respectively.

EXAMPLE 2

3-(p-chlorophenyl)-2H-indeno[1,2-c]pyrazole
Step A: 3'-(p-chlorophenyl)-spiro[indan-2,2'-oxirane]-1-one To a stirred solution of 2-bromo indanone and 5 g of p-chlorobenzaldehyde in 20 ml. of methanol under nitrogen is added at 5° to 10°C a solution of sodium methoxide in methanol (prepared by dissolving 1.15 g. of sodium in 50 ml. of methanol). After 2 hours, 3'-(p-chlorophenyl)-spiro[indan-2,2'-oxirane]-1-one precipitates and is filtered off and recrystallized from methanol.

Following essentially the same procedure as above but using an equivalent amount of
a. 4-methylbenzaldehyde;
b. 3,4-dichlorobenzaldehyde;
c. 3,4-dimethoxybenzaldehyde;
d. 3-trifluoromethylbenzaldehyde;
e. 3,4-methylenedioxybenzaldehyde;
f. 2-thiophenealdehyde;
g. 2-furfural;
h. 2-pyrrolealdehyde;
i. pyridine-4-carboxaldehyde;
j. pyridine-3-carboxaldehyde or
k. pyridine-2-carboxaldehyde in place of the p-chlorobenzaldehyde, there is obtained a. 3'-(p-tolyl)-spiro[indan-2,2'-oxirane]-1-one;
b. 3'-(3,4-dichlorophenyl)-spiro[indan-2,2'-oxirane]-1-one;
c. 3'-(3,4-dimethoxyphenyl)-spiro]indan-2,2'-oxirane]-1-one;
d. 3'-(3-trifluoromethylphenyl)-spiro[indan-2,2'-oxirane]-1-one;

e. 3'-(3,4-methylenedioxyphenyl)-spiro[indan-2,2'-oxirane]-1-one;
f. 3'-(2-thienyl)-spiro[indan-2,2'-oxirane]-1-one;
g. 3'-(2-furyl)-spiro[indan-2,2'-oxirane]-1-one;
h. 3'-(2-pyrrolyl)-spiro[indan-2,2'-oxirane]-1-one;
i. 3'-(4-pyridyl)-spiro[indan-2,2'-oxirane]-1-one;
j. 3'-(3-pyridyl)-spiro[indan-2,2'-oxirane]-1-one or
k. 3'-(2-pyridyl)-spiro[indan-2,2'-oxirane]-1-one respectively.

When an equivalent amount of
l. 2-bromo-5-chloro-indanone;
m. 2-bromo-5-methyl-indanone;
n. 2-bromo-5,6-dimethoxy-indanone;
o. 2-bromo-5-trifluoromethyl indanone or
p. 2-bromo-5,6-methylenedioxy-indanone
is used in place of the 2-bromo indanone in Step A of example 2 there is obtained l. 3'-(p-chlorophenyl)-spiro[5-chloroindan-2,2'-oxirane]-1-one; (m.p. 152°–153°C);
m. 3'-(p-chlorophenyl)-spiro[5-methylindan-2,2'-oxirane]-1-one;
n. 3'-(p-chlorophenyl)spiro[5,6-dimethoxyindan-2,2'-oxirane]-1-one;
o. 3'-(p-chlorophenyl)-spiro[5-trifluoromethylindan-2,2'-oxirane]-1-one or
p. 3'-(p-chlorohenyl)-spiro[5,6-methylenedioxindan-2,2'-oxirane]-1-one
respectively.

Step B: 3'-(p-chlorophenyl)-spiro[indan-2,2'-oxirane]-1-one hydrazone

A solution of 5 grams of 3'-(p-chlorophenyl)-spiro[indan-2,2'-oxirane]-1-one in 20 ml. of toluene is cooled in an icebath to an internal temperature of 0° to 5°C and treated dropwise with 25 ml. of 97% NH$_2$NH$_2$. After stirring an additional two hours, the resultant hydrazone of 3-(p-chlorophenyl)-spiro[indan-2,2'-oxirane]-1-one is isolated as an oil.

Following the above procedure but using an equivalent amount of each of the compounds (a) through (p) from step A above in place of the 3-(p-chlorophenyl)-spiro[indan-2,2'-oxirane]-1-one, there is obtained the hydrazone of each of the compounds (a) through (p).

Step C: 3-(p-chlorophenyl)-4H-indeno[1,2-c]pyrazole

A solution of 3 grams of 3'-(p-chlorophenyl)-spiro[indane-2,2'-oxirane]-1-one hydrazone, 50 ml. of toluene and 100 milligrams of p-toluenesulfonic acid is stirred and refluxed for 8 hours. The toluene layer is washed with 10 ml of 10% sodium bicarbonate, dried with magnesium sulfate, filtered and concentrated in vacuo to yield 3-(p-chlorophenyl)-4H-indeno [1,2-c]pyrazole (m.p. 266°–268°C).

When the above procedure is carried out using an equivalent amount of the hydrazone of each of the compounds (a) through (p) from Step B above in place of the 3'-(p-chlorophenyl)-spiro[indan-2,2'-oxirane]-1-one hydrazone, there is obtained:

a. 3-(p-tolyl)-4H-indeno[1,2-c]pyrazole (250°–252°C);
b. 3-(3,4-dichlorophenyl)-4H-indeno[1,2-c]pyrazole (m.p. 252°C);
c. 3(3,4-dimethoxyphenyl)-4H-indeno[1,2-c]pyrazole (m.p. 231°C);
d. 3-(3-trifluoromethylphenyl)-4H-indeno[1,2-c]pyrazole (260°–262°C);
e. 3-(3,4-methylenedioxyphenyl)-4H-indeno[1,2c]pyrazole (285°–287°C);
f. b 3-(2-thienyl)-4H-indeno[1,2c]pyrazole (220°–221°C);
g. 3-(2-furyl)-4H-indeno[1,2-c]pyrazole (186°–188°C);
h. 3-(2-pyrrolyl)-4H-indeno[1,2-c]pyrazole (m.p. 215°–218°C);
i. 3-(4-pyridyl)-4H-indeno[1,2-c]pyrazole(m.p. 270°–272°C);
j. 3-(3-pyridyl)-4H-indeno[1,2-c]pyrazole (m.p. 229°–231°C);
k. 3-(2-pyridyl)-4H-indeno[1,2-c]pyrazole (m.p. 216°–218°C);
l. 6-chloro-3-(p-chlorophenyl)-4H-indeno[1,2-c]pyrazole (m.p. 280°C);
m. 6-methyl-3-(p-chlorophenyl)-4H-indeno[1,2-c]pyrazole (m.p. 294°–295°C);
n. 6,7-dimethoxy-3-(p-chlorophenyl)-4H-indeno[1,2-c]-pyrazole (m.p. 235°C);
o. 6-trifluoromethyl-3-(p-chlorophenyl)-4H-indeno[1,2-c]pyrazole or
p. 6,7-methylenedioxy-3-(p-chlorophenyl)-4H-indeno[1,2-c]pyrazole(m.p. 278°C)
respectively.

EXAMPLE 3

4,5-dihydro-3-(4-pyridyl)-2H-naphtho[1,2-c]pyrazole
Step A: 3-(4-pyridyl-3,3a, 4,5-tetrahydro-2H-naphtho[1,2-c]pyrazole-3a-ol A solution of 5 grams of 3'-(4-pyridyl)-spiro[1,2,3,4-tetrahydronaphthalene-2,2'-oxirane]-1-one hydrazone, 0.1 ml. of concentrated hydrochloric acid and 25 ml. of methanol is allowed to stand for about 24 hours at room temperature. The solution is then treated with 15 ml. of diethyl ether and after standing 3 hours, 3-(4-pyridyl)-3,3a, 4,5-tetrahydro-2H-naphtho[1,2-c]pyrazole-3a-ol is filtered off.

When the above process is carried out using an equivalent amount of the hydrazones of compounds (a) through (q) of example 1, step A or the hydrazones of the compounds (a) through (p) of example 2, Step A in place of the 3'-(4-pyridyl)-spiro[1,2,3,4-tetrahydronaphthalene-2,2'-xoirane]-1-one hydrazone, there is obtained 1a. 7-chloro-3-(4-pyridyl)-3,3a, 4,5-tetrahydro-2H-naphtho[1,2-c]pyrazole-3a-ol;
1b. 7-methyl-3-(4-pyridyl)-3,3a, 4,5-tetrahydro-2H-naphtho[1,2-c]pyrazole-3a-ol;
1c. 7,8-dimethoxy-3-(4-pyridyl)-3,3a, 4,5-tetrahydro-2H-naphtho[1,2-c]pyrazole-3a-ol;
1d. 7-trifluoromethyl-3-(4-pyridyl)-3,3a, 4,5-tetrahydro-2H-naphtho[1,2-c]pyrazole-3a-ol;
1e. 7,8-methylenedioxy-3-(4-pyridyl)-3,3a,4,5-tetrahydro-2H-naptho[1,2-c]pyrazole-3a-ol;
1f. 7-methoxy-3-(4-pyridyl)-3,3a,4,5-tetrahydro-2H-naphtho[1,2-c]pyrazole-3a-ol;
1g. 3-(2-thienyl)-3,3a,4,5-tetrahydro-2H-naphtho[1,2-c]pyrazole-3a-ol;
1h. 3-(2-furyl)-3,3a,4,5-tetrahydro-2H-naphtho[1,2-c]pyrazole-3a-ol;
1i. 3-(2-pyrrolyl)-3,3a,4,5-tetrahydro-2H-naphtho[1,2-c]pyrazole-3a-ol;
1j. 3-(2-pyridyl)-3,3a,4,5-tetrahydro-2H-naphtho[1,2-c]pyrazole-3a-ol;
1k. 3-(3-pyridyl)-3,3a,4,5-tetrahydro-2H-naphtho[1,2-c]pyrazole-3a-ol;

1*l*. 3-(p-chlorophenyl)-3,3a,4,5-tetrahydro-2H-naphtho[1,2-c]pyrazole-3a-ol;

1*m*. 3-(p-methoxyphenyl)-3,3a,4,5-tetrahydro-2H-naphtho[1,2-c]pyrazole-3a-ol;

1*n*. 3-phenyl-3,3a,4,5-tetrahydro-2H-naphtho[1,2-c]pyrazole-3a-ol;

1*o*. 3-(p-tolyl)-3,3a,4,5-tetrahydro-2H-naphtho[1,2-c]pyrazole-3a-ol;

1*p*. 3-(m-tolyl)-3,3a,4,5-tetrahydro-2H-naphtho[1,2-c]pyrazole-3a-ol or

1*q*. 3-(o-tolyl)-3,3a,4,5-tetrahydro-2H-naphtho[1,2-c]pyrazole-3a-ol; respectively from the hydrazones of the compounds (*a*) through (*q*) of example 1 step A or 2*a*. 3-(p-tolyl)-3a,4-dihydro-indeno[1,2-c]pyrazole-3a-ol;

2*b*. 3-(3,4-dichlorophenyl)-3a,4-dihydro-indeno[1,2-c]pyrazole-3a-ol;

2*c*. 3-(3,4-dimethoxyphenyl)-3a,4-dihydro-indeno[1,2-c]pyrazole-3a-ol;

2*d*. 3-(3-trifluoromethylphenyl)-3a,4-dihydro-indeno[1,2-c]pyrazole-3a-ol;

2*e*. 3-(3,4-methylenedioxyphenyl)-3a,4-dihydro-indeno[1,2-c]pyrazole-3a-ol;

2*f*. 3-(2-thienyl)-3a,4-dihydro-indeno[1,2-c]pyrazole-3a-ol;

2*g*. 3-(2-furyl)-3a,4-dihydro-indeno[1,2-c]pyrazole-3a-ol;

2*h*. 3-(21pyrrolyl)-3a,4-dihydro-indeno[1,2-c]pyrazole-3a-ol;

2*i*. 3-(4-pyridyl)-3a,4-dihydro-indeno[1,2-c]pyrazole-3a-ol;

2*j*. 3-(3-pyridyl)-3a,4-dihydro-indeno[1,2-c]pyrazole-3a-ol;

2*k*. 3-(2-pyridyl)-3a,4-dihydro-indeno[1,2-c]pyrazole-3a-ol;

2*l*. 6-chloro-3-(p-chlorophenyl)-3a,4-dihydro-indeno[1,2-c]pyrazole-3a-ol

2*m*. 6-methyl-3-(p-chlorophenyl)-3a,4-dihydro-indeno[1,2-c]pyrazole-3a-ol;

2*n*. 6,7-dimethoxy-3-(p-chlorophenyl)-3a,4-dihydro-indeno[1,2-c]pyrazole-3a-ol;

2*o*. 6-trifluoromethyl-3-(p-chlorophenyl)-3a,4-dihydro-indeno[1,2-c]pyrazole-3a-ol or 2*p*. 6,7-methylenedioxy-3-(p-chlorophenyl)-3a,4-dihydro-indeno[1,2-c]pyrazole-3a-ol respectively from the hydrazones of the compounds (*a*) through (*p*) of example 2, Step B.

Step B: 4,5-dihydro-3-(4-pyridyl)-2H-naphtho[1,2-c]pyrazole

A solution of 3 grams of 3'-(4-pyridyl)-3,3a,4,5-tetrahydro-2H-naphtho[1,2-c]pyrazole-3a-ol, 50 ml of toluene and 100 milligrams of p-toluenesulfonic acid is stirred and refluxed for 8 hours. The toluene layer is washed with 10 ml. of 10% sodium bicarbonate solution, dried with magnesium sulfate, filtered and concenrated in vacuo to yield 3-(4-pyridyl)-4,5-dihydro-2H-naphtho[1,2-c]pyrazole (m.p. 229°C).

Following the above procedure and using an equivalent amount of each of the compounds (1*a*) through (1*q*) or (2*a*) through (2*p*) from Step A of this example in place of the 3-(4-pyridyl)-3,3a,4,5-tetrahydro-2H-naphtho[1,2-c]pyrazole-3a-ol, there is obtained the corresponding products (*a*) through (*q*) set out in Step C of example 1 from compounds (1*a*) through (1*q*) or the corresponding products (*a*) through (*p*) set out in Step C of example 2 from compounds (2*a*) through (2*q*).

When an equivalent amount of 3-(4-pyridyl)-spiro[benzo(b) cycloheptan-2,2'-oxirane]-1-one hydrazone or 8-methoxy-3-(4-pyridyl)-spiro[benzo(b) cycloheptan-2,2'-oxirane]-1-one hydrazone is substituted for the 3-(4-pyridyl)-spiro[1,2,3,4-tetrahydronaphthalene-2,2'-oxirane]-1-one hydrazone in Step A of this example there is obtained following the processes of steps A, B and C above, 3-(4-pyridyl)-2,4,5,6-tetrahydrobenzo[6,7]-cyclohepta[1,2-c]pyrazole (mp 217°–219°C) or 9-methoxy-3-(4-pyridyl)-2,4,5,6-tetrahydrobenzo[6,7]cyclohepta[1,2-c]pyrazole (m.p. 200°–201°C).

EXAMPLE 4

4,5-dihydro-3-(4-pyridyl)-2H-naphtho[1,2-c]pyrazole

Step A: 3'-(4-pyridyl)-spiro[1,2,3,4-tetrahydronaphthalene-2,2'-oxirane]-1-one, N-acetylhydrazone A solution of 6 grams of 3'-(4-pyridyl)-spiro[1,2,3,4-tetrahydronaphthalene-2,2'-oxirane]-1-one from Step A of example 1, 30 ml. of N-acetylhydrazine and 30 ml. of isopropanol is stirred for about 24 hours at room temperature. The resultant solid is filtered off to give the N-acetylhydrazone of 3'-(4-pyridyl)-spiro[1,2,3,4-tetrahydronaphthalene-2,2'-oxirane]-1-one.

Step B: 2-acetyl-4,5-dihydro-3-(4-pyridyl)-2H-naphtho[1,2-c]pyrazole

A solution of 5 g of 3'-(4-pyridyl)-2H-naphtho[1,2-c]pyrazole-3'-(4-pyridyl)-spiro[1,2,3,4-tetrahydronaphthalene-2,2'-oxirane]-1-one, N-acetylhydrazone, 1 ml. of acetic acid, 10 ml. of methanol and 15 ml. of dioxane is stirred and refluxed for ca 15 hours. On cooling to room temperature there is obtained 2-acetyl-3-(4-pyridyl)-4,5-dihydro-2H-naphtho[1,2-c]pyrazole.

when an equivalent amount of each of the compounds (*a*) through (*q*) of example 1, Step A or compounds (*a*) through (*p*) of example 2, Step A is used in place of the 3'-(4-pyridyl)-spiro-(1,2,3,4-tetrahydronaphthalene-2,2'-oxirane]-1-one above, there is obtained the corresponding N-acetylhydrazone after carrying out Step A; and after carrying out Step B with each of the products from Step A there is obtained:

1*a*. 2-acetyl-7-chloro-4,5-dihydro-3-(4-pyridyl)-2H-naphtho[1,2-c]pyrazole;

1*b*. 2-acetyl-7-methyl-4,5-dihydro-3-(4-pyridyl)-2H-naphtho[1,2-c]pyrazole;

1*c*. 2-acetyl-7,8-dimethoxy-4,5-dihydro-3-(4-pyridyl)-2H-naphtho[1,2-c]pyrazole;

1*d*. 2-acetyl-7-trifluoromethyl-4,5-dihydro-3-(4-pyridyl)-2H-naphtho[1,2-c]pyrazole;

1*e*. 2-acetyl-7,8-methylenedioxy-4,5-dihydro-3-(4-pyridyl)-2H-naphtho[1,2-c]pyrazole;

1*f*. 2-acetyl-4,5-dihydro-3-(2-thienyl)-2H-naphtho[1,2-c]pyrazole;

1*g*. 2-acetyl-4,5-dihydro-3-(2-thienyl)-2H-naphtho[1,2-c]pyrazole;

1*h*. 2-acetyl-4,5-dihydro-3-(2-furyl-2H-naphtho[1,2-c]pyrazole;

1*i*. 2-acetyl-4,5-dihydro-3-(2-pyrrolyl)-2H-naphtho[1,2-c]pyrazole;

1*j*. 2-acetyl-4,5-dihydro-3-(2-pyridyl)-2H-naphtho[1,2-c]pyrazole;

1k. 2-acetyl-4,5-dihyro-3-(3-pyridyl)-2H-naphtho[1,2-c]pyrazole;
1l. 2-acetyl-4,5-dihydro-3-(p-chlorophenyl)-2H-naphtho[1,2-c]pyrazole;
1m. 2-acetyl-4,5-dihydro-3-(p-methoxyphenyl)-2H-naphtho[1,2-c]pyrazole;
1n. 2-acetyl-4,5-dihydro-3-phenyl-2H-naphtho[1,2-c]pyrazole;
1o. 2-acetyl-4,5-dihydro-3-(p-tolyl)-2H-naphthol[1,2-c]pyrazole;
1p. 2-acetyl-4,5-dihydro-3-(m-tolyl)-2H-naphtho[1,2-c]pyrazole;
1q. [-acetyl-4,5-dihydro-3-(o-tolyl)-2H-naphtho[1,2c]pyrazole respectively from the compound of example 1, Step A or
2a. 2-acetyl-3-(p-tolyl)-4H-indeno[1,2-c]pyrazole;
2b. 2-acetyl-(3,4-dichlorophenyl)-4H-indeno[1,2-c]pyrazole;
2c. 2-acetyl-3-(3,4-dimethoxyphenyl)-4H-indeno[1,2-c]pyrazole;
2d. 2-acetyl-3-(3-trifluoromethylphenyl)-4H-indeno[1,2-c]pyrazole;
2e. 2-acetyl-3-(3,4-methylenedioxyphenyl)-4H-indeno[1,2-c]pyrazole;
2f. 2-acetyl-3-(2-thienyl)-4H-indeno[1,2-c]pyrazole;
2g. 2-acetyl-3-(2-furyl)-4H-indeno[1,2-c]pyrazole;
2h. 2-acetyl-3-(2-pyrrolyl)-4H-indeno[1,2-c]pyrazole;
2i. 2-acetyl-3-(4-pyridyl)-4H-indeno[1,2-c]pyrazole;
2j. 2-acetyl-3-(3-pyridyl)-4H-indeno[1,2-c]pyrazole;
2k. 2-acetyl-3-(2-pyridyl)-4H-indeno[1,2-c]pyrazole;
2l. 2-acetyl-6-chloro-3-(p-chlorophenyl)-4H-indeno[1,2-c]pyrazole;
2m. 2-acetyl-6-methyl-3-(p-chlorophenyl)-4H-indeno[1,2-c]pyrazole;
2n. 2-acetyl-6,7-dimethoxy-3-(p-chlorophenyl)-4H-indeno[1,2-c]pyrazole;
2o. 2-acetyl-6-trifluoromethyl-3-(p-chlorophenyl)-4H-indeno[1,2-c]pyrazole or
2p. 2-acetyl-6,7-methylenedioxy-3-(p-chlorophenyl)-4H-indeno[1,2-c]pyrazole respectively from the compounds of example 2, Step A.

Step C: 4,5-dihydro-3-(4-pyridyl)-2H-naphtho[1,2-c]pyrazole

A solution of 5 grams of 2-acetyl-4,5-dihydro-3-(4-pyridyl)-2H-naphtho[1,2-c]pyrazole, 5 grams of potassium hydroxide and 100 ml of 95% ethanol is stirred and refluxed for about 15 hours. The solution is then treated with 200 ml. of water, and the resultant solid is filtered off to give 4,5-dihydro-3-(4-pyridyl)-2H-naphtho[1,2-c]pyrazole (m.p. 229°C).

When the above process is carried out using an equivalent amount of each of the compounds (1a) through (1q) or (2a) through (2p) from Steps A and B of this example, there is obtained the products (a) through (q) from Step c of example 1 or the products (a) through (p) from Step C of example 2.

When an equivalent amount of the N-acetyl hydrazone of 3'-(4-pyridyl)-spiro[benz(b) cycloheptane-2,2'-oxirane]-1-one or 8-methoxy-3'-(4-pyridyl)-spiro[benz(b) cycloheptane-2,2'-oxirane]-1-one prepared as described in Step A of this example is used in place of the 3'-(4-pyridyl)-spiro[1,2,3,4-tetrahydronaphthalene-2,2'-oxirane]-1-one in Step B above, there is obtained 2-acetyl-3-(4-pyridyl)-2,4,5,6-tetrahydrobenzo[6,7]cycloheptal[1,2-c]pyrazole or 2-acetyl-9-methoxy-3-(4-pyridyl)-2,4,5,6-tetrahydrobenzo[6,7]cyclohepta[1,2-c]pyrazole respectively after carrying out the process of Step B and 3-(4-pyridyl)-2,4,5,6-tetrahydrobenzo[6,7]cyclohepta[1,2-c]pyrazole (m.p. 217°–219°C) or 9-methoxy-3-(4-pyridyl)-2,4,5,6-tetrahydrobenzo[6,7]cyclohepta[1,2-c]pyrazole m.p. 200°–201°C) respectively, after carrying out the process of Step C.

EXAMPLE 5

4,5-dihydro-3-(4-pyridyl)-2H-naphtho[1,2-c]pyrazole

Step A: 2-acetyl-3-(4-pyridyl)-3,3a,4,5-tetrahydro-2H-naphtho[1,2-c]pyrazole-3a-ol A solution of 6 grams of 3'-(4-pyridyl)-spiro[1,2,3,4-tetrahydronaphthalene-2,2'-oxirane]-1-one, N-acetyl hydrazone prepared as in Step A of example 4, .1 ml of cencentrated hydrochloric acid and 15 ml. of methanol is allowed to stand for about 24 hours at room temperature. The solution is then treated with 25 ml of diethyl ether; and after 3 hours, 2-acetyl-3-(4-pyridyl) -3,3a,4,,5-tetrahydro-2H-naphtho[1,2-c]pyrazole-3a-ol is filtered off.

Step B: 2-acetyl-4,5-dihydro-3-(4-pyridyl)-2H-naphtho[1,2-c]pyrazole

A solution of 5 g of 2-acetyl-3-(4-pyridyl)-3,3a,4,5-tetrahydro-2H-naphtho[1,2-c]pyrazole-3a-ol, 1 ml. acetic acid, 10 ml. of methanol and 15 ml. of dioxane is stirred and refluxed for about 15 hours. On cooling to room temperature there is obtained 2-acetyl-4,5-dihydro-3-(4-pyridyl)-2H-naphtho[1,2-c]pyrazole.

Step C: 4,5-dihydro-3-(4-pyridyl)-2H-naphtho[1,2-c]pyrazole

A solution of 5 g. of 2-acetyl-4,5-dihydro-3-(4-pyridyl)-2H-naphtho[1,2-c]pyrazole, 5 g. of potassium hydroxide and 100 ml. of 95% ethanol is stirred and refluxed for about 15 hours. The solution is then treated with 200 ml. of water and the resultant solid filtered off to give 4,5-dihydro-3-(4-pyridyl)-2H-naphtho[1,2-c]pyrazole (m.p. 229°C).

When the above processes of Steps A, B and C are carried out using an equivalent amount of the N-acetyl hydrazones of each of the compounds (a) through (q) of example 1, Step A or compounds (a) through (p) of example 2, Step A in place of the 3'-(4-pyridyl)-spiro[1,2,3,4-tetrahydronaphthalene-2,2'-oxirane]-1-one, N-acetyl hydrazone in Step A of this example, there is obtained each of the corresponding products (a) through (q) of example 1, Step C or (a) through (p) of example 2, Step C.

EXAMPLE 6

Step A: 2-acetyl-3-(4-pyridyl)-3,3a,4,5-tetrahydro-2H-naphtho[1,2-c]pyrazole-3a-ol, acetic acid ester.

A solution of 6 grams of 3-(4-pyridyl)-3,3a,4,5-tetrahydro-2H-naphtho[1,2-c]pyrazole-3a-ol prepared as in example 3, Step A, 5 ml of acetic anhydride in 25 ml of toluene and 3 grams of sodium acetate are refluxed for about 5 to 6 hours. After filtering off the solids present, the solvent is evaporated off to yield the title product.

Step B: 2-acetyl-4,5-dihydro-3-(4-pyridyl)-2H-naphtho[1,2-c]pyrazole

A solution of 5 grams of the above 2-acetyl-3-(4-pyridyl)-3,3a,4,5-tetrahydro-2H-naphtho[1,2- c]pyrazole-3a-ol, acetic acid ester and 1 ml of concentrated hydrochloric acid in 15 ml of methanol is refluxed for 4 to 8 hours. The solvent is evaporated off and the residue is treated with 25 ml of 10% sodium carbonate solution. This mixture is then extracted three times with 10 ml of methylene chloride, and after evaporation, the title product is obtained.

Step C: 4,5-dihydro-3-(4-pyridyl)-2H-naphtho[1,2-c]pyrazole

A solution of 5 g. of 2-acetyl-3-(4-pyridyl)-4,5-dihydro-2H-naphtho[1,2-c]pyrazole, 5 g. of potassium hydroxide and 100 ml of 95% ethanol was stirred and refluxed for ca. 15 hours. The solution was then treated with 200 ml of H$_2$O and the resultant solid filtered off to give 4,5-dihydro-3-(4-pyridyl)-2H-naphtho[1,2-c]pyrazole(m.p. 229°C).

What is claimed is:

1. A process for preparing a compound of the formula

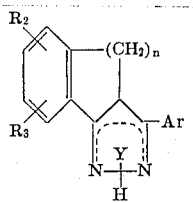

where ring (Y) represents the structures

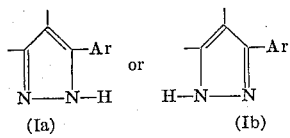

$n$ is 1,2 or 3;
Ar is

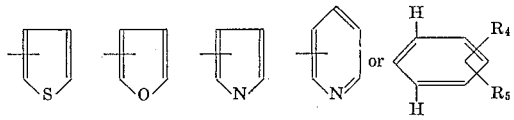

and

R$_2$, R$_3$, R$_4$ and R$_5$ each independently represent hydrogen, halo having an atomic weight of about 19 to 36, lower alkyl having 1 to 4 carbon atoms, lower alkoxy, trifluoromethyl or R$_2$ and R$_3$ or R$_4$ and R$_5$ together independently represent methylenedioxy attached to adjacent carbon atoms, provided than when R$_2$ and R$_3$ or R$_4$ and R$_5$ are independently trifluoromethyl or tertiary butyl they are not on adjacent carbon atoms, and when $n$ is 1 and R$_2$ and R$_3$ are hydrogen, Ar is other than unsubstituted phenyl which comprises cyclizing a compound of the formula

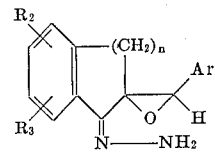

where $n$, Ar, R$_2$, R$_3$ and the proviso are as defined above with a lower alkyl carboxylic acid or an alkyl or aryl sulfonic acid at a temperature of about 75°C to about 175°C.

2. The process of claim 1 in which $n$ is 2 in the compound produced.

3. The process of claim 1 in which $n$ is 3 in the compound produced.

4. The process of claim 1 in which Ar is pyridyl in the compound produced.

5. The process of claim 4 in which $n$ is 2 in the compound produced.

6. The process of claim 4 in which $n$ is 3 in the compound produced.

7. The process of claim 1 in which Ar is

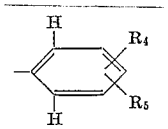

where R$_4$, R$_5$ and the proviso are defined in claim 1.

8. The process of claim 7 in which $n$ is 2 in the compound produced.

9. The process of claim 1 in which 4,5-dihydro-3-(4-pyridyl)-2H-naphtho[1,2-c]pyrazole is produced.

10. The process of claim 1 in which 4,5-dihydro-3-(2-pyridyl)-2H-naphtho[1,2-c]pyrazole is produced.

11. The process of claim 1 in which 4,5-dihydro-3-(3-pyridyl)-2H-naphtho[1,2-c]pyrazole is produced.

12. The process of claim 1 in which 4,5-dihydro-3-(p-chlorophenyl)-2H-naphtho[1,2-c]pyrazole is produced.

13. The process of claim 1 in which 4,5-dihydro-3-(p-methoxy phenyl)-2H-naphtho[1,2-c]pyrazole is produced.

14. The process of claim 1 in which 3-(4-pyridyl)-2,4,5,6-tetrahydrobenzo[6,7]cyclohepta[1,2-c]pyrazole is produced.

15. The process of claim 1 in which 4,5-dihydro-3-phenyl-2H-naphtho[1,2-c]pyrazole is produced.

16. The process of claim 1 in which 3-(3,4-dimethoxyphenyl)-4H-indeno[1,2-c]pyrazole is produced.

17. A process according to claim 1 in which p-toluene sulfonic acid is the cyclizing agent.

* * * * *